United States Patent
Umezuki et al.

(10) Patent No.: US 9,690,735 B2
(45) Date of Patent: Jun. 27, 2017

(54) SWITCH AND CONTROL METHOD

(71) Applicant: FUJITSU LIMITED, Kawasaki-shi, Kanagawa (JP)

(72) Inventors: Takeshi Umezuki, Yokohama (JP); Masaaki Tashiro, Tokyo (JP)

(73) Assignee: FUJITSU LIMITED, Kawasaki (JP)

( * ) Notice: Subject to any disclaimer, the term of this patent is extended or adjusted under 35 U.S.C. 154(b) by 360 days.

(21) Appl. No.: 14/311,400

(22) Filed: Jun. 23, 2014

(65) Prior Publication Data

US 2015/0006781 A1    Jan. 1, 2015

(30) Foreign Application Priority Data

Jun. 28, 2013  (JP) ................ 2013-136352

(51) Int. Cl.
| | |
|---|---|
| *G06F 3/00* | (2006.01) |
| *G06F 13/28* | (2006.01) |
| *G06F 5/00* | (2006.01) |
| *G06F 13/40* | (2006.01) |
| *G06F 1/26* | (2006.01) |

(52) U.S. Cl.
CPC .......... *G06F 13/4022* (2013.01); *G06F 1/266* (2013.01); *Y02B 60/1228* (2013.01); *Y02B 60/1235* (2013.01)

(58) Field of Classification Search
CPC ......... G06F 3/061; G06F 11/142; G06F 13/24
USPC ................ 710/260, 26, 3, 4, 9, 36
See application file for complete search history.

(56) References Cited

U.S. PATENT DOCUMENTS

| | | | |
|---|---|---|---|
| 2007/0220204 A1 | 9/2007 | Nakajima et al. | |
| 2008/0126616 A1 | 5/2008 | Kumasawa et al. | |
| 2008/0263217 A1* | 10/2008 | Kimizuka | H04L 67/2814 709/229 |
| 2008/0313362 A1* | 12/2008 | Takamoto | G06F 11/2017 710/19 |
| 2009/0007135 A1* | 1/2009 | Rathunde | G06F 8/65 718/107 |
| 2009/0292932 A1 | 11/2009 | Oyama et al. | |
| 2010/0228798 A1* | 9/2010 | Kodama | G06F 17/30241 707/822 |

(Continued)

FOREIGN PATENT DOCUMENTS

| | | |
|---|---|---|
| JP | 2007-256993 A | 10/2007 |
| JP | 2008-41050 | 2/2008 |

(Continued)

OTHER PUBLICATIONS

Japanese Office Action mailed Feb. 7, 2017 for corresponding Japanese Patent Application No. 2013-136352, with Partial English Translation, 8 pages.

*Primary Examiner* — Idriss N Alrobaye
*Assistant Examiner* — Getente A Yimer
(74) *Attorney, Agent, or Firm* — Fujitsu Patent Center

(57) ABSTRACT

A switch connected to an external device, the switch including: a plurality of ports connected to the external devices; a storage unit to store a zone database indicating a group in which each of the plurality of ports is included; and a processor to perform power control of the plurality of ports and permit communication between only ports included in the same group, on the basis of the zone database, wherein the processor powers off a port that is not included in any group among the plurality of ports, on the basis of the zone database.

8 Claims, 23 Drawing Sheets

(56) References Cited

U.S. PATENT DOCUMENTS

2012/0317319 A1* 12/2012 Myrah .................. H04L 67/288
  710/74
2015/0058518 A1* 2/2015 Kleineberg ........... H04L 67/141
  710/316

FOREIGN PATENT DOCUMENTS

| JP | 2009-282859 | 12/2009 |
| JP | 2012-524928 A | 10/2012 |
| WO | 2011/018817 A1 | 2/2011 |

\* cited by examiner

FIG. 3

| PORT | DEVICE NAME | DESTINATION PORT NAME | DEVICE TYPE | CONNECTION STATE |
|---|---|---|---|---|
| 0 | 20:00:00:e0:8b:13:08:10 | 21:00:00:e0:8b:13:08:10 | Initiator | Online |
| 2 | 20:00:00:e0:8b:13:08:60 | 21:00:00:e0:8b:13:08:60 | Target | Online |
| 3 | 20:00:00:e0:8b:13:08:10 | 21:00:00:e0:8b:13:08:20 | Initiator | Online |

333

| CONFIGURATION NAME | ZONE NAME | MEMBER NAME |
|---|---|---|
| Config1 | Zone1 | 10:00 |
| Config1 | Zone1 | 10:01 |
| Config1 | Zone1 | 10:02 |
| Config2 | Zone2 | 10:11 |
| Config2 | Zone2 | 20:11 |

334

F I G. 4

| PORT | ZONE NAME | DEVICE TYPE | CONNECTION STATE | POWER STATE |
|---|---|---|---|---|
| 0 | Zone1 | Initiator | Online | On |
| 1 | (Null) | (Null) | Offline | Off |
| 2 | Zone1 | Target | Online | On |
| 3 | (Null) | Initiator | Offline | Saving |

335

F I G. 5

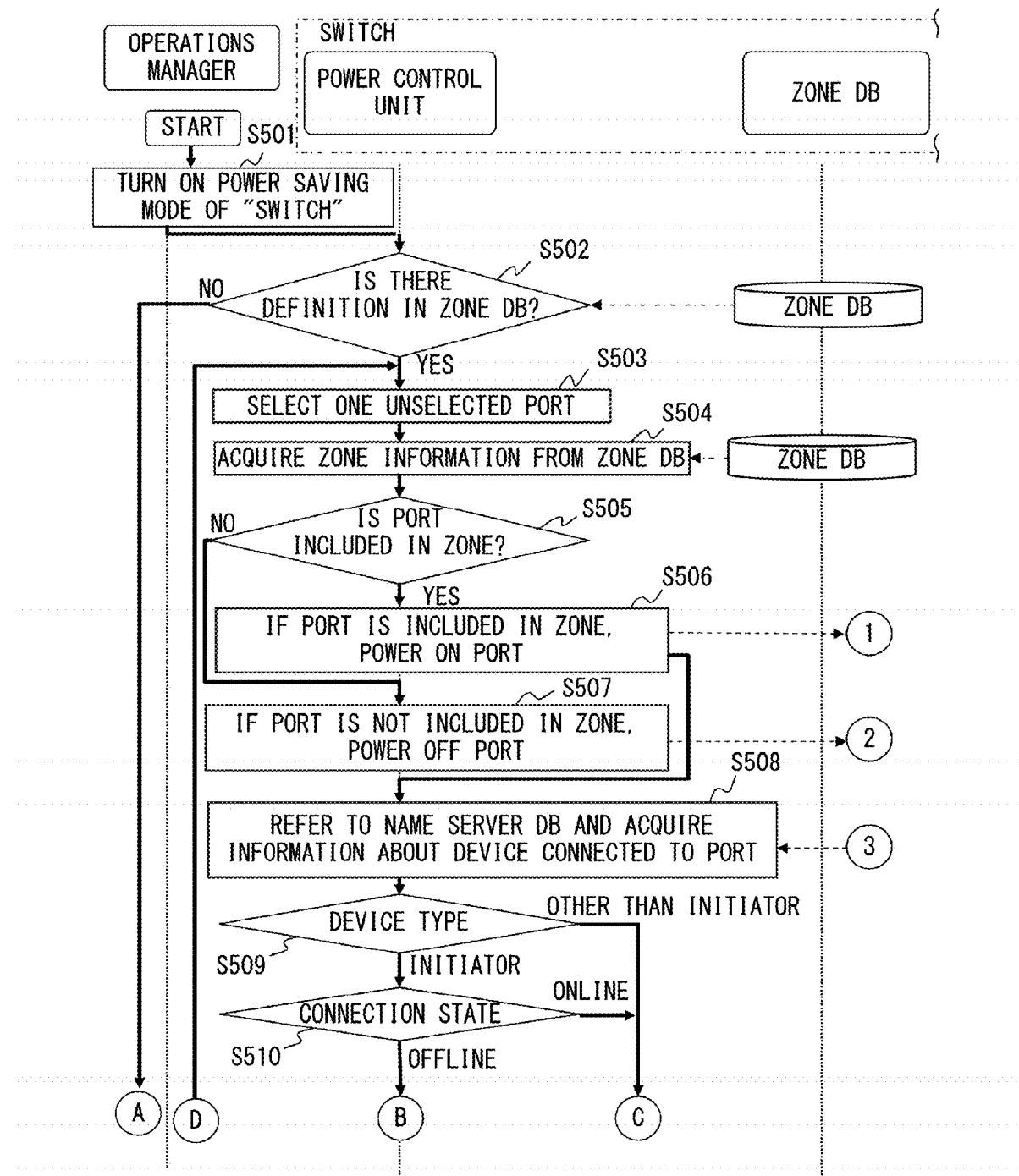
F I G. 8 A

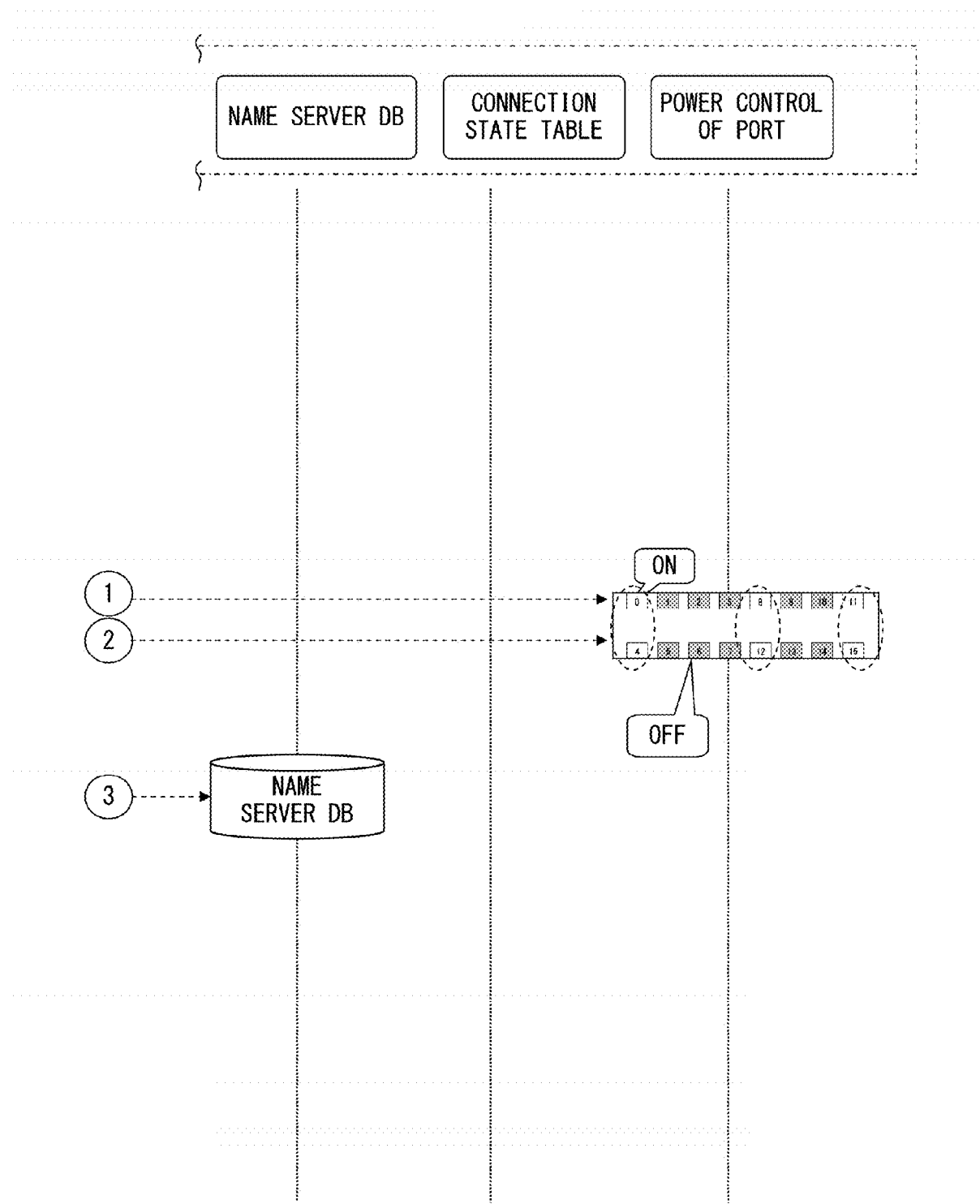
F I G. 8 B

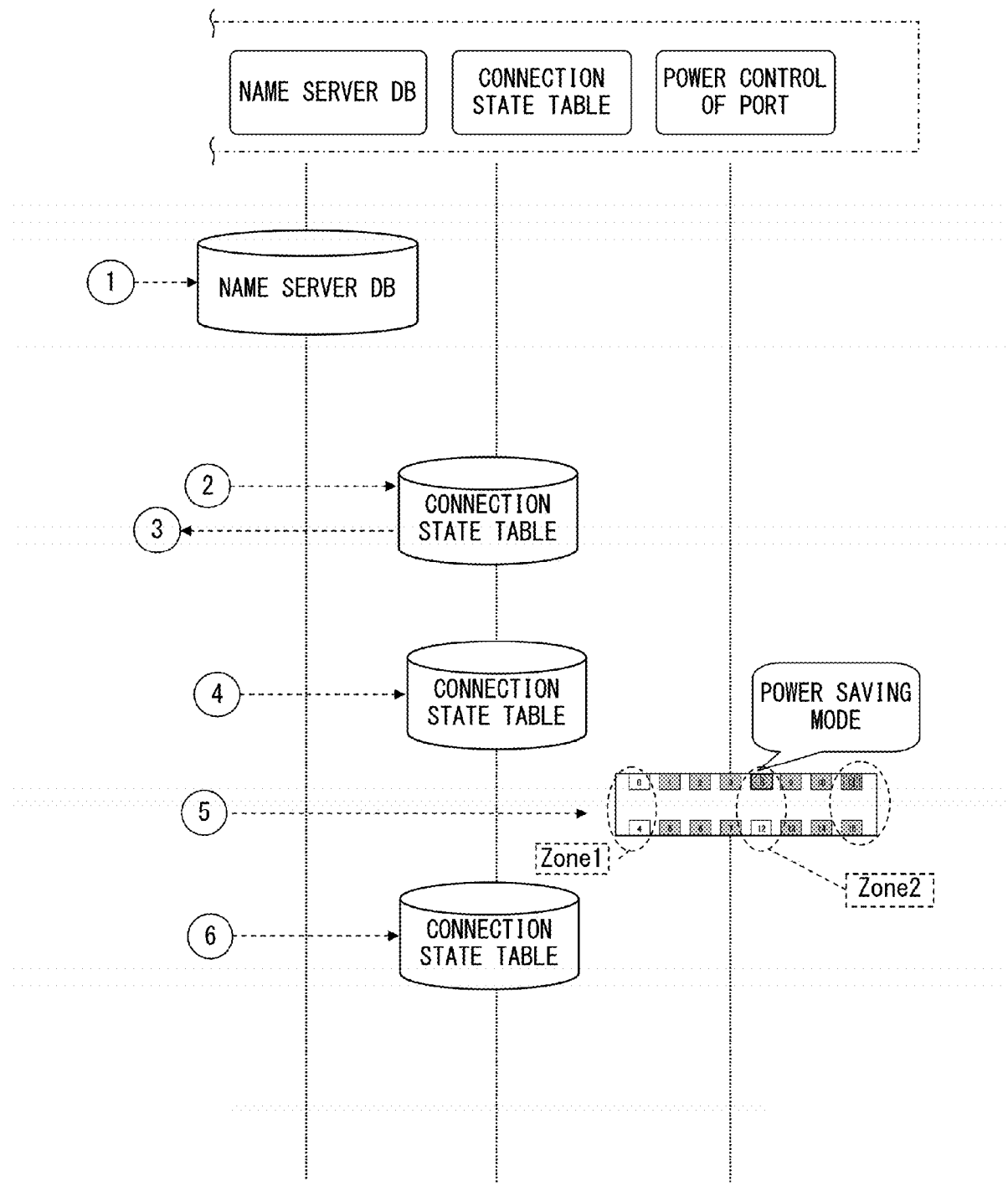
F I G. 10B

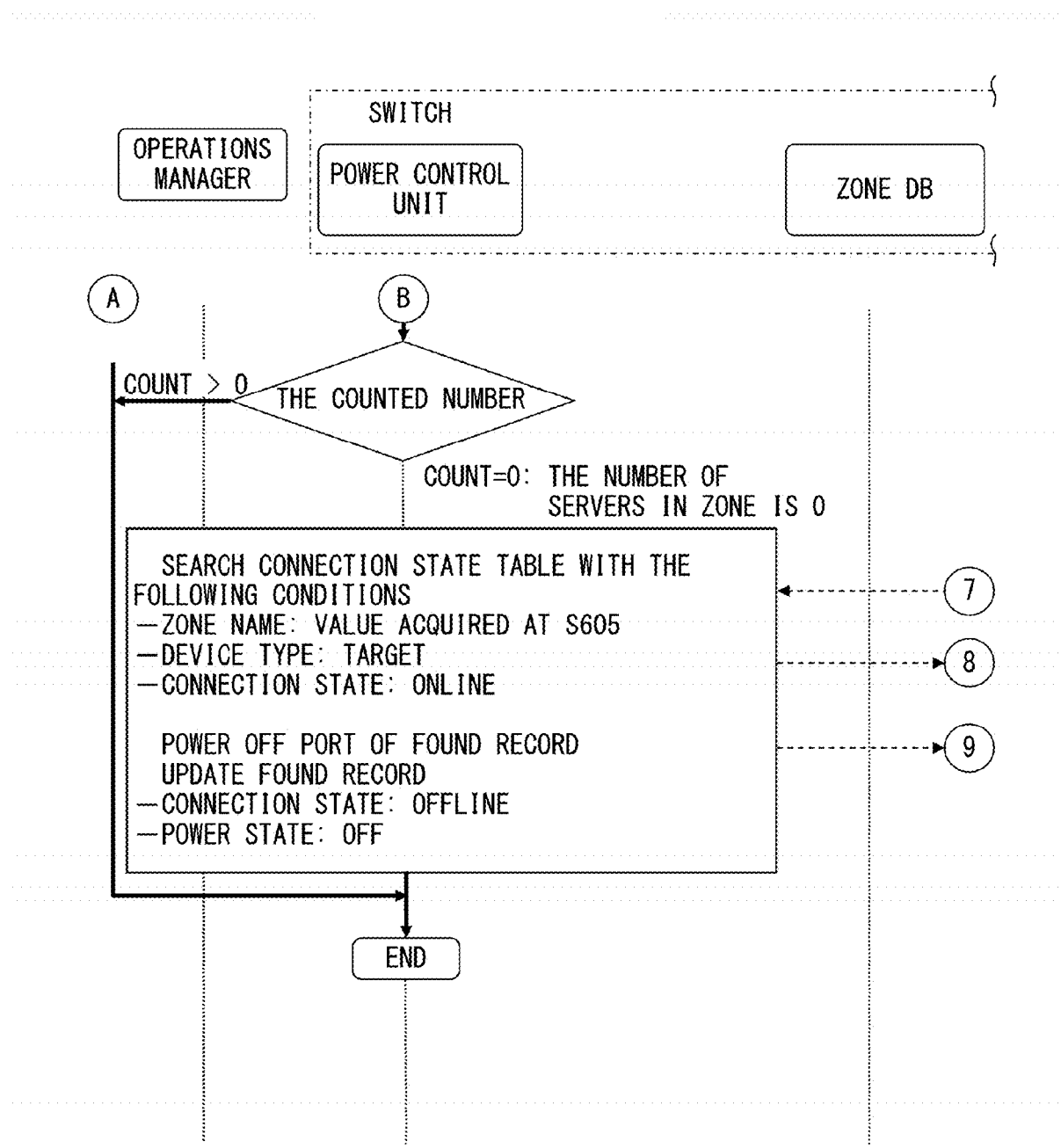
F I G. 1 0 C

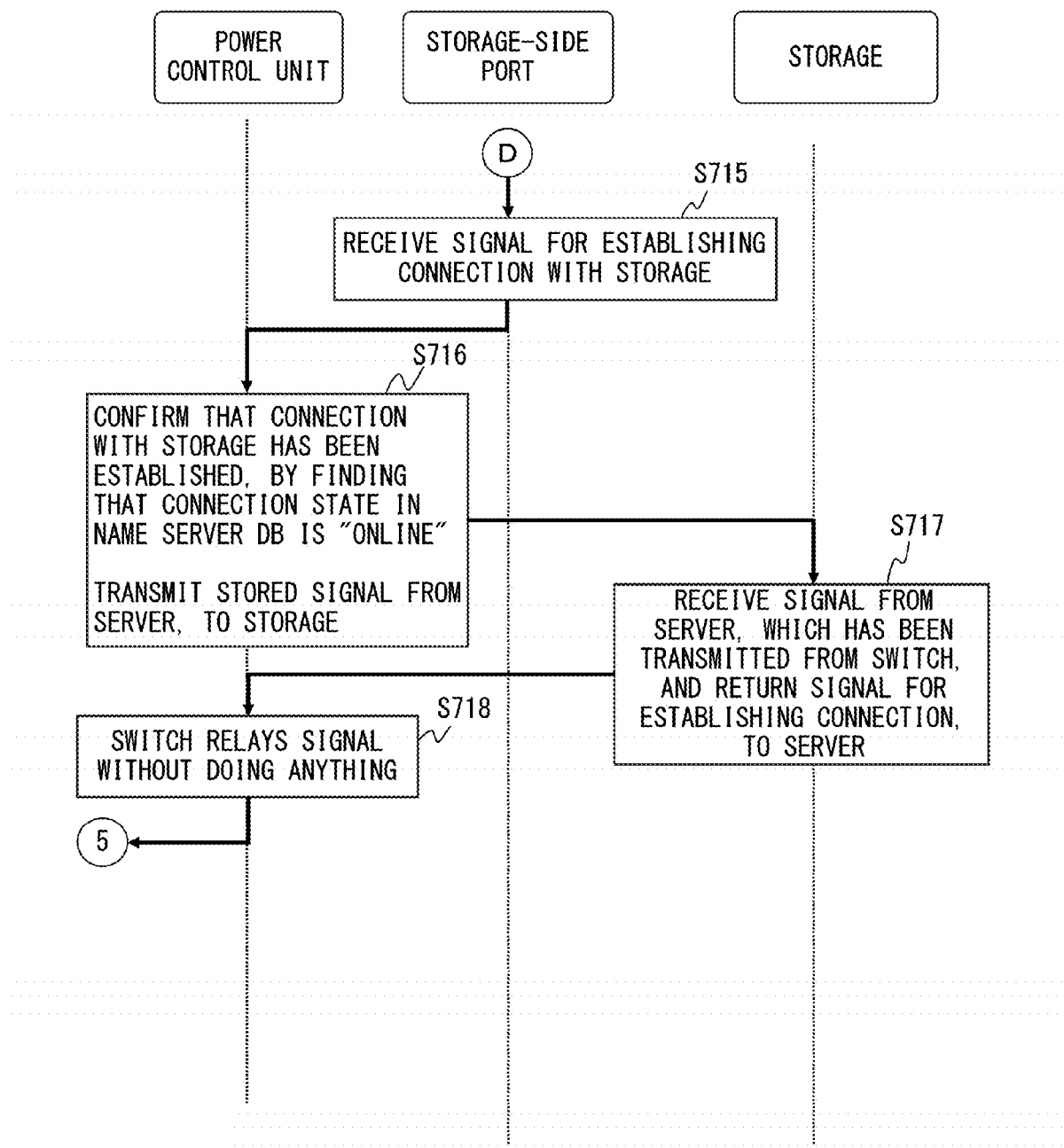
F I G. 1 2 F

SWITCH AND CONTROL METHOD

CROSS-REFERENCE TO RELATED APPLICATION

This application is based upon and claims the benefit of priority of the prior Japanese Patent Application No. 2013-136352, filed on Jun. 28, 2013, the entire contents of which are incorporated herein by reference.

FIELD

The embodiments discussed herein are related to a switch and a control method.

BACKGROUND

Currently, storage area networks (SANs) in which a server and a storage are connected via a high-speed network are used.

In the SAN, a fiber channel switch is used as a device connecting the server and the storage.

A conventional fiber channel switch is not equipped with a power saving function, and its ports are continuously being powered on even if there is an unused port. Therefore, there is a problem that power is wastefully consumed (Japanese Patent Laid-Open No. 2009-282859 and Japanese Patent Laid-Open No. 2008-41050).

SUMMARY

According to an aspect of the invention, a switch is connected to external devices and is provided with a plurality of ports connected to the external devices, a storage unit and a processor.

The storage unit stores a zone database indicating a group in which each of the plurality of ports is included.

The processor performs power control the plurality of ports and powers off a port which is not included in any group among the plurality of ports, on the basis of the zone database.

The processor permits communication between ports included in the same group, on the basis of the zone database.

A switch of another embodiment is connected to external devices and is provided with a plurality of ports connected to the external devices, a storage unit and a processor.

The storage unit stores a zone database indicating a group in which each of the plurality of ports is included, and a connection state table in which the group in which each of the plurality of ports is included, a type of the external device connected to each of the plurality of ports, and a state of connection with the external device are written.

The processor performs power control of the plurality of ports.

The processor permits communication between ports included in the same group, on the basis of the zone database, and continuously transmits a signal from a port when the port is being powered on.

The processor detects that the external device has been powered off, refers to the connection state table, and, when the type of the external device that has been powered off is an information processing device, stops transmission of the signal from a port connected to the information processing device that has been powered off.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 3 is a diagram illustrating an example of a name server DB;

FIG. 4 is a diagram illustrating an example of a zone DB;

FIG. 5 is a diagram illustrating an example of a connection state table;

FIG. 7 is a diagram illustrating the system when the power saving mode of the switch is turned on;

FIG. 8A is a sequence diagram illustrating a process of the system when the power saving mode is turned on;

FIG. 8B is the sequence diagram illustrating the process of the system when the power saving mode is turned on;

FIG. 8C is the sequence diagram illustrating the process of the system when the power saving mode is turned on;

FIG. 8D is the sequence diagram illustrating the process of the system when the power saving mode is turned on;

FIG. 10B is the sequence diagram illustrating the process of the system when the server is powered off;

FIG. 10C is the sequence diagram illustrating the process of the system when the server is powered off;

FIG. 11 is a diagram illustrating the system when the server is powered on;

FIG. 12A is a sequence diagram illustrating a process of the system when the server is powered on;

FIG. 12B is the sequence diagram illustrating the process of the system when the server is powered on;

FIG. 12C is the sequence diagram illustrating the process of the system when the server is powered on;

FIG. 12D is the sequence diagram illustrating the process of the system when the server is powered on;

FIG. 12E is the sequence diagram illustrating the process of the system when the server is powered on; and FIG. 12F is the sequence diagram illustrating the process of the system when the server is powered on.

DESCRIPTION OF EMBODIMENTS

An embodiment will be described below with reference to drawings.

Figure 1:
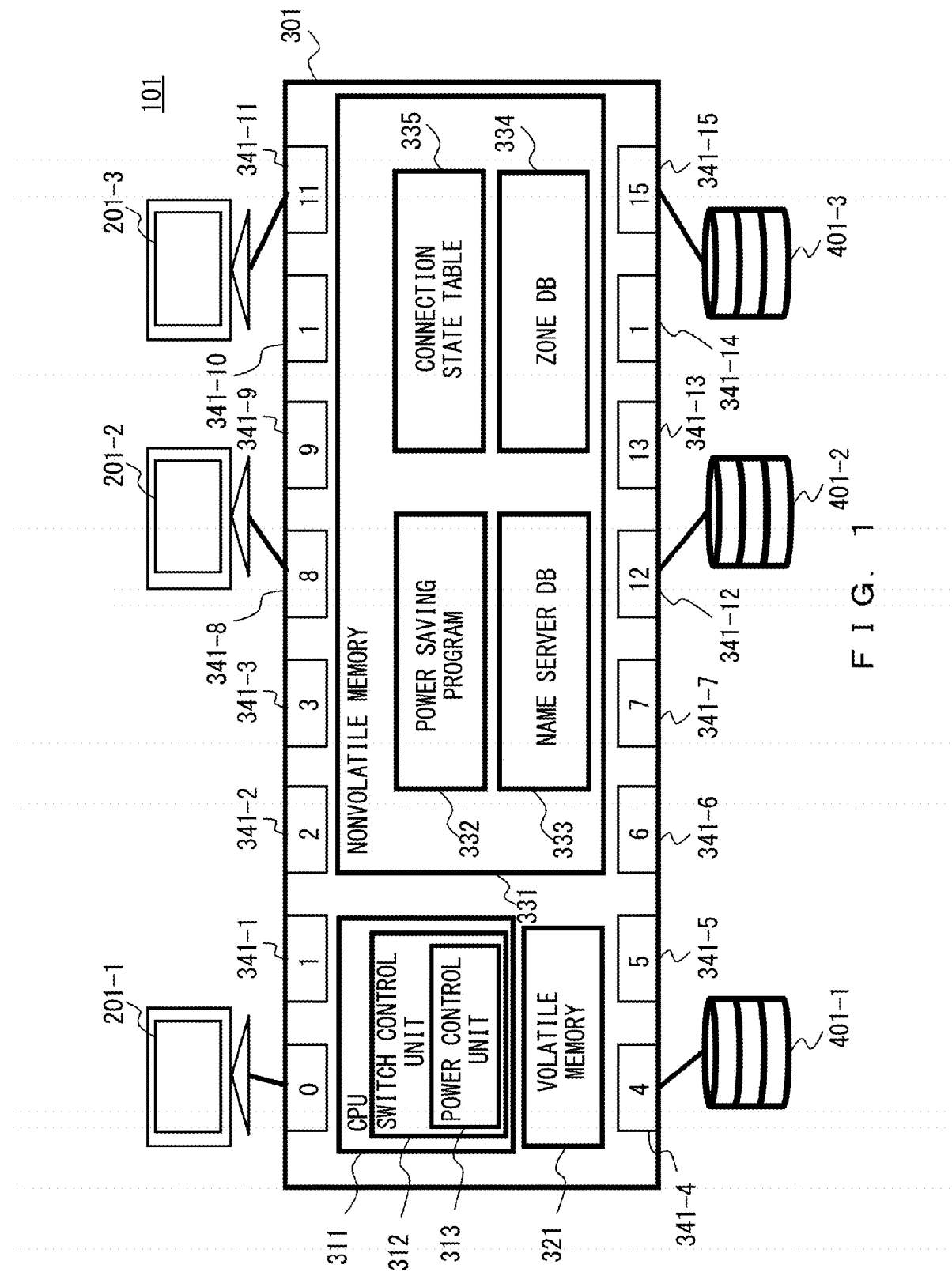
FIG. 1 is a configuration diagram of a system according to an embodiment.

FIG. 1 is a configuration diagram of a system according to the embodiment.

A system 101 includes servers 201-*i* (i=1 to 3), a fiber channel switch 301 (hereinafter referred to as the switch 301), and storages 401-*j* (j=1 to 3).

The servers 201 and the switch 301, and the switch 301 and the storages 401 are connected via fiber channels, respectively. In FIG. 1, the servers 201, the switch 301 and the storages 401 constitute a SAN.

The server 201 transmits a reading request to the storage 401 and reads out data from the storage 401. The server 201 also transmits a writing request and data to the storage 401 and writes the data into the storage 401.

The server 201 is an example of an information processing device.

The switch 301 performs data transfer between the server 201 and the storage 401.

The switch 301 includes a central processing unit (CPU) 311, a volatile memory 321, a nonvolatile memory 331, and ports 341-$k$ ($k$=0 to 15).

The CPU 311 is a processor (a processing unit) which performs various processes.

The CPU 311 includes a switch control unit 312.

The switch control unit 312 performs a process of relaying data and control of the switch 301. The switch control unit 312 performs control so as to permit communication (I/O traffic) only within the same group, on the basis of a zone DB 334.

The switch control unit 312 performs reading from and writing to a name server database (DB) 333, the zone DB 334 and a connection state table 335.

The switch control unit 312 is realized by a program for controlling the switch 301 being read out into the volatile memory 321 and the CPU 311 executing the program on the volatile memory 321.

The switch control unit 312 includes a power control unit 313.

The power control unit 313 controls power on/off of the ports 341 on the basis of the name server DB 333, the zone DB 334 and the connection state table 335.

The power control unit 313 powers on or off the ports 341 or causes the ports to be in the power saving mode.

Here, the power saving mode will be explained.

When a port 341 is being powered on, the switch control unit 312 continuously transmits an electric signal from the port 341. Even when a device is not connected to the port 341, the port 341 continuously transmits an electric signal. This is for, when a device is connected to the port 341, notifying the device of the connection.

The power saving mode is a state in which the switch control unit 312 stops transmission of an electric signal from the port 341 in response to an instruction from the power control unit 313, and the port 341 performs only reception of a signal (though the port 341 continues to be powered on). For example, if a port connected to a server is also powered off when the server is being powered off, the port cannot receive a notification from the server even when the server is powered on. Therefore, when the server is being powered off, the port 341 enters the power saving mode in which only signal reception is performed. In the power saving mode, since transmission of an electric signal is not performed, power consumption is reduced.

The power control unit 313 is realized by a power saving program 332 being read out into the volatile memory 321 and the CPU 311 executing the power saving program 332 on the volatile memory 321.

The switch control unit 312 and the power control unit 313 can be also realized by hardware circuits such as a programmable logic device (PLD) and an application specific integrated circuit (ASIC).

The volatile memory 321 is a storage device which stores data, programs and the like used by the switch 301. The volatile memory 321 is, for example, a random access memory (RAM).

The nonvolatile memory 331 is a storage device which stores data, programs and the like used by the switch 301. The nonvolatile memory 331 is, for example, a flash memory.

The nonvolatile memory 331 stores the power saving program 332, the name server DB 333, the zone DB 334 and the connection state table 335.

The power saving program 332 is a program which performs power control of the ports 341.

The details of the name server DB 333, the zone DB 334 and the connection state table 335 will be described later.

The port 341 is an interface which connects to an external device (a server 201 and a storage 401) and performs data input/output (signal reception/transmission) with the external device.

An index number $k$ for identifying a port is assigned to the port 341-$k$. In drawings and the description of the specification, the port 341-$k$ may be referred to as the port $k$.

The switch 301 can power on/off the ports 341 individually.

In the embodiment, a port 341-0, a port 341-8, a port 341-11, a port 341-4, a port 341-12 and a port 341-15 are connected to a server 201-1, a server 201-2, a server 201-3, a server 401-1, a server 401-2 and a server 401-3, respectively.

The storage 401 is a device which stores data. The storage 401 is, for example, a magnetic disk device (a hard disk drive (HDD)), a magnetic tape device, a disk array device provided with a plurality of HDDs or the like.

The switch 301 performs access control using zoning.

Figure 2:
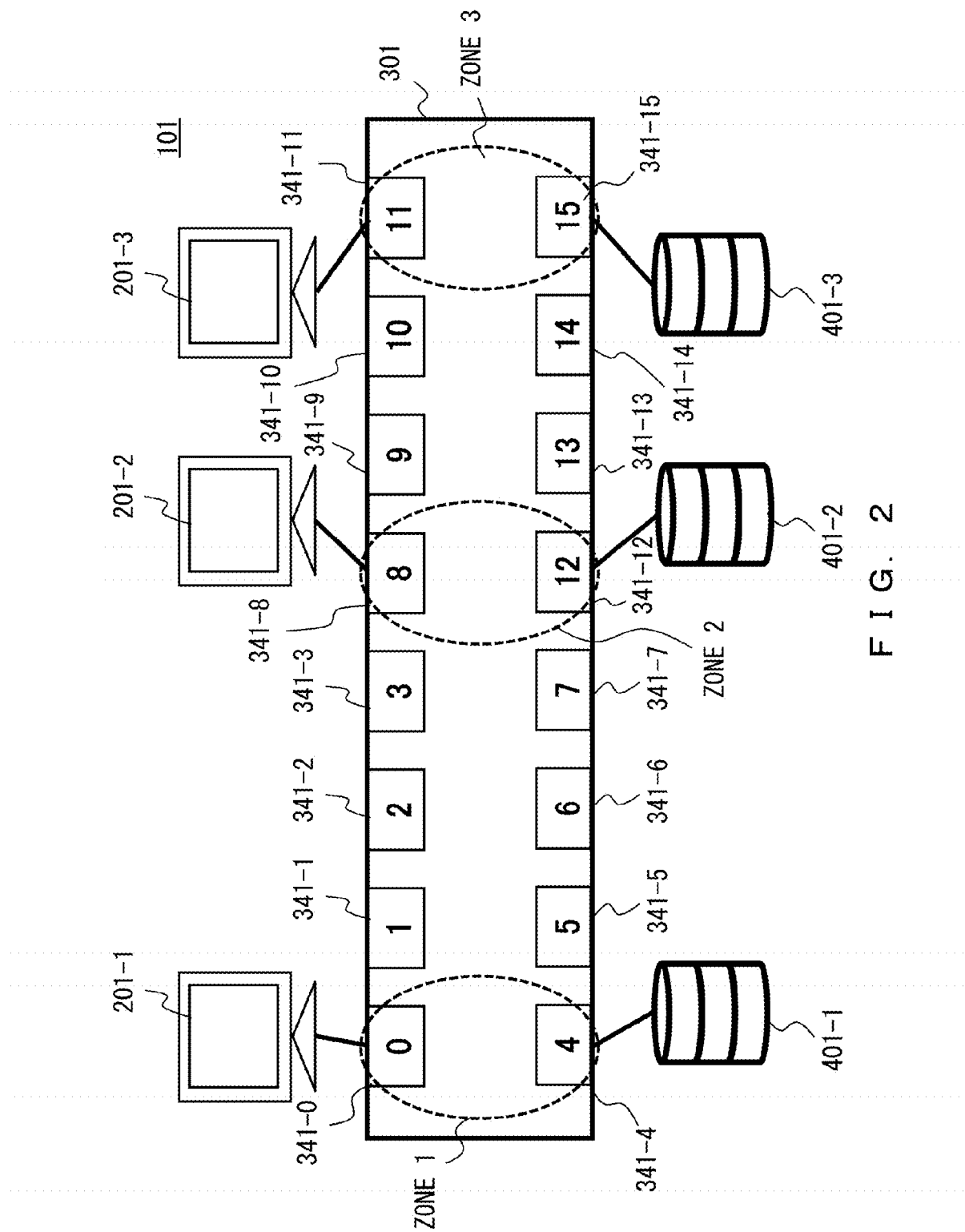
FIG. 2 is a diagram illustrating zones of the system according to the embodiment.

FIG. 2 is a diagram illustrating zones of the system according to the embodiment.

Zoning is to create definitions of grouping the index numbers of the ports 341 and grouping the ports 341 on the basis of the definitions. A defined group is called a zone.

The switch control unit 312 performs control so as to permit communication (I/O traffic) only within a group.

As shown in FIG. 2, ports 0 and 4 are included in a zone 1; ports 8 and 12 are included in a zone 2; and ports 11 and 15 are included in a zone 3.

Thereby, communication between the server 201-1 and the storage 401-1 is permitted. Each of communication between the server 201-2 and the storage 401-2 and communication between the server 201-3 and the storage 401-3 is also permitted.

FIG. 3 is a diagram illustrating an example of the name server DB.

In the name server DB 333, information about devices (for example, the servers 201 and the storages 401) connected to the switch 301 is written.

In the name server DB 333, a port, a device name, a destination port name, a device type, and a connection state are written in association with one another.

The port is indicated by an index number assigned to a port 341 connected to a device.

The device name is a world wide name (WWN) of the device connected to the port 341.

The destination port name is the WWN of the port of the device connected to the port 341.

The device type indicates the type of the device connected to the port 341. The device type is, for example, "Initiator" if the device is a server, "Target" if the device is a storage, and "Unknown" if the device type is unknown.

The connection state shows a connection state between the port 341 and the device. The connection state is "Online"

or "Offline". The connection state is "Online" if the device is being powered on. The connection state is "Offline" if the device is being powered off.

FIG. 4 is a diagram illustrating an example of the zone DB.

In the zone DB 334, zoning setting information, that is, a zone definition showing which port is included in which zone is written.

In the zone DB 334, a configuration name, a zone name, and a member name are written in association with one another.

The configuration name is a name given to a unit for which zone setting is enabled or disabled.

The zone name is the name of a zone.

The member name is information about a port included in the zone. The member name is a format of combination of a number (a node number) assigned to the switch 301 and the index number of a port 341. For example, "10:2" indicates a port with an index number 2 of a switch with a node number 10.

The zone DB 334 shown in FIG. 4 shows that ports with index numbers 0, 1 and 2 of the switch with the node number 10 are included in Zone 1, and that a port with an index number 11 of the switch with the node number 10 and a port with an index number 11 of a switch with a node number 20 are included in Zone 2.

FIG. 5 is a diagram illustrating an example of the connection state table.

In the connection state table 335, states of connections with devices connected to the switch 301 are written.

In the connection state table 335, a port, a zone name, a device type, a connection state, and a power state are written in association with one another.

The port is indicated by an index number assigned to a port 341 connected to a device.

The zone name is the name of a zone.

The device type shows the type of the device connected to the port. The device type is, for example, "Null" if a device is not connected, "Initiator" if the device is a server, "Target" if the device is a storage, and "Switch" if the device is a switch.

The connection state shows a connection state between the port 341 and the device. The connection state is "Online" in the case of being connected to the device (that is the device is being powered on). The connection state is "Offline" in the case of not being connected to the device (that is the device is being powered off).

The power state shows the power state of the port 341. The power state is "On" if the port is being powered on, "Off" if the port is being powered off, and "Saving" if the port is in the power saving mode.

The connection state table 335 shown in FIG. 5 shows that the port 0 is included in Zone 1, connected to a server, online with the server and is being powered on. The connection state table 335 shown in FIG. 5 shows that the port 2 is included in Zone 1, connected to a storage, online with the storage and is being powered on.

The connection state table 335 shown in FIG. 5 also shows that a device is not connected to the port 1, and that the port 3 is in the power saving mode.

Next, description will be made on how power control of the ports 341 is performed for each transition of the state of the switch 301 and the servers 201.

Figure 6:
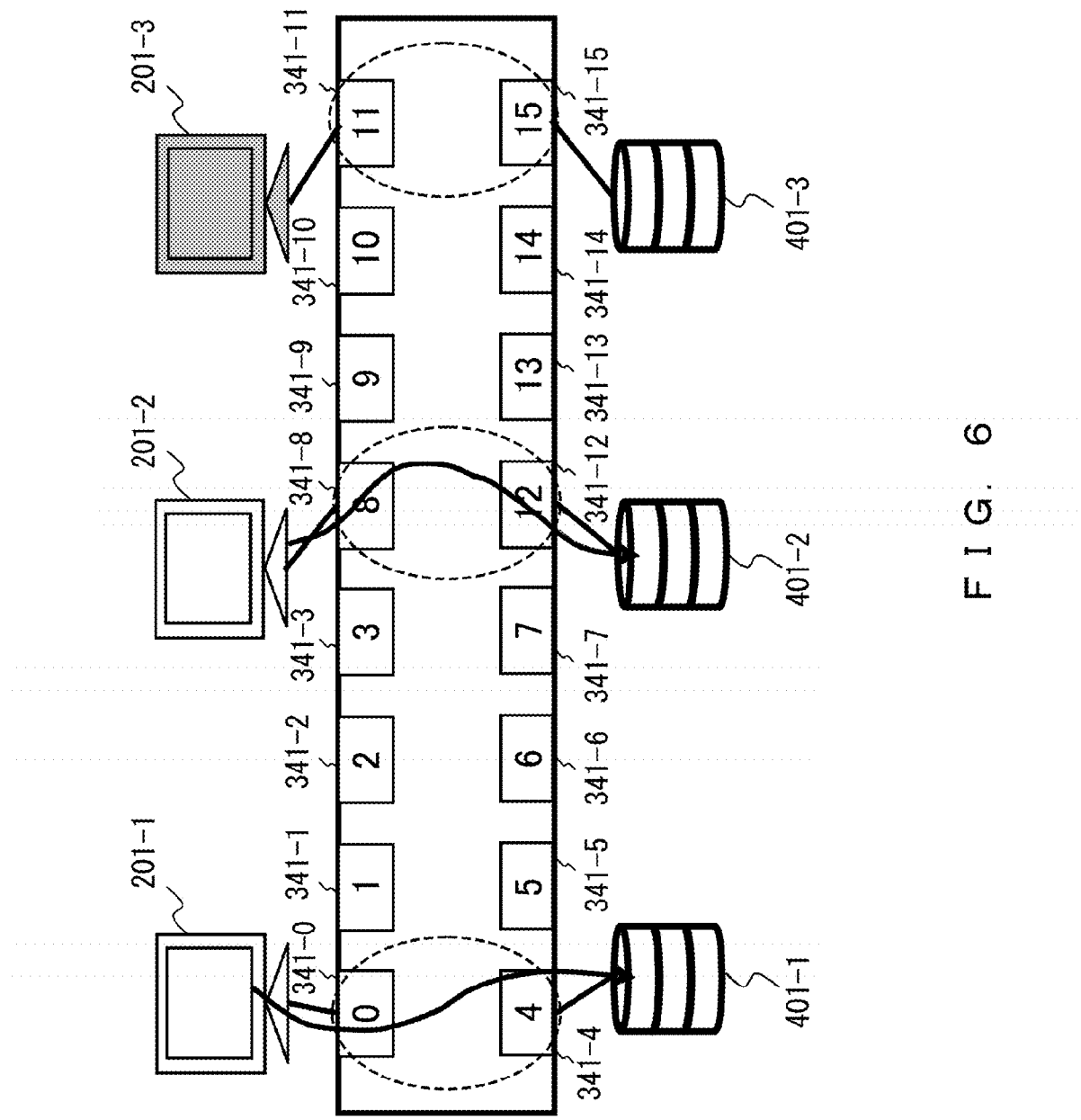
FIG. 6 is a diagram illustrating the system when a power saving mode of a switch is off.

FIG. 6 is a diagram illustrating the system when the power saving mode of the switch is off.

In FIG. 6, the servers 201-1 and 202-2 and the storages 401-1 to 401-3 are being powered on, and the server 201-3 is being powered off.

As described with reference to FIG. 2, the ports 0 and 4 are included in a zone 1; ports 8 and 12 are included in a zone 2; and ports 11 and 15 are included in a zone 3. The zones are similarly set in the description below also.

When the power saving mode of the switch 301 is off, that is, when the power control unit 313 is not operating, all the ports 341 are being powered on irrespective of whether zones are defined or not.

Next, a process performed in the case where the power saving mode is turned on will be described.

Figure 7:
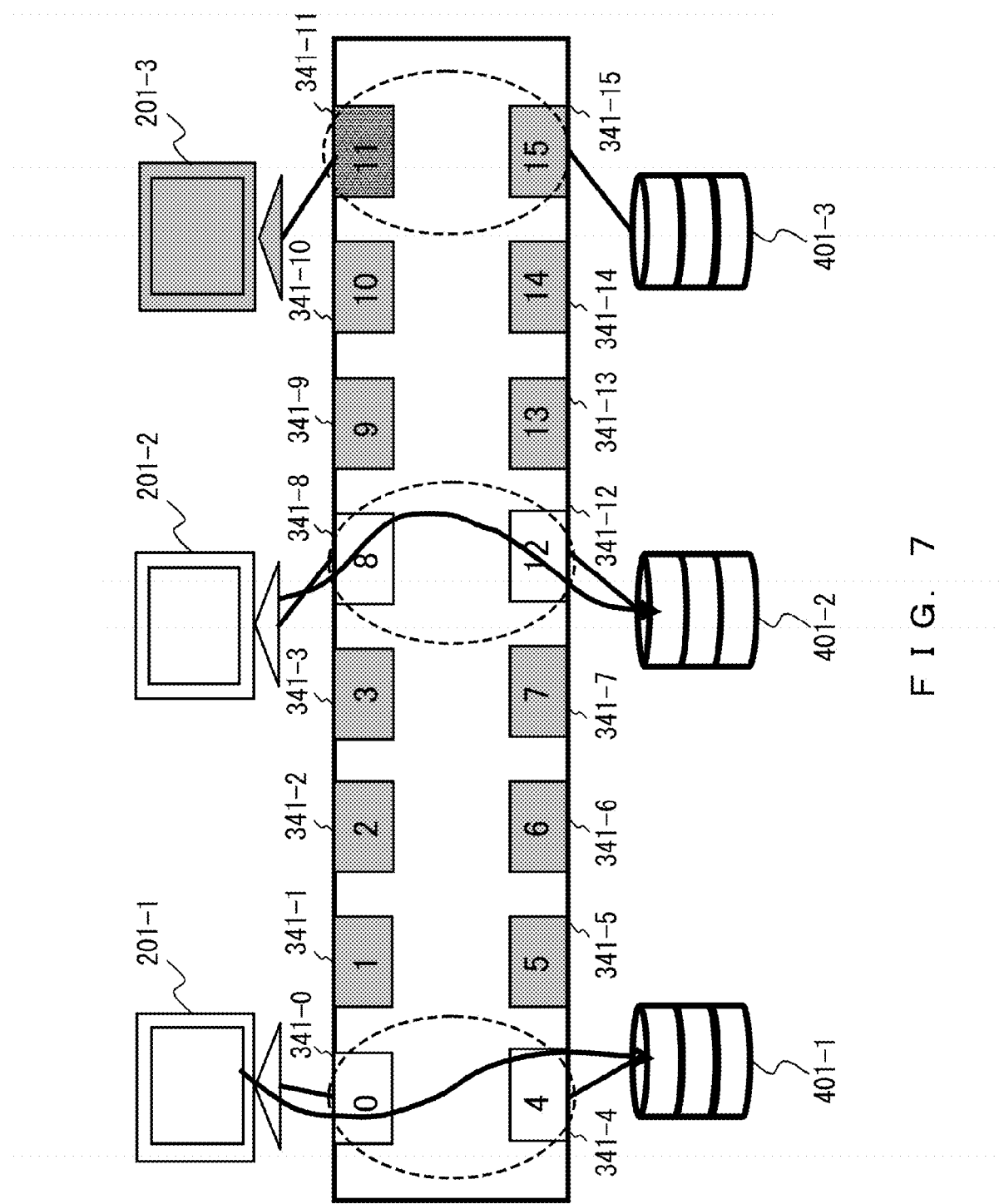
Figure 8C:
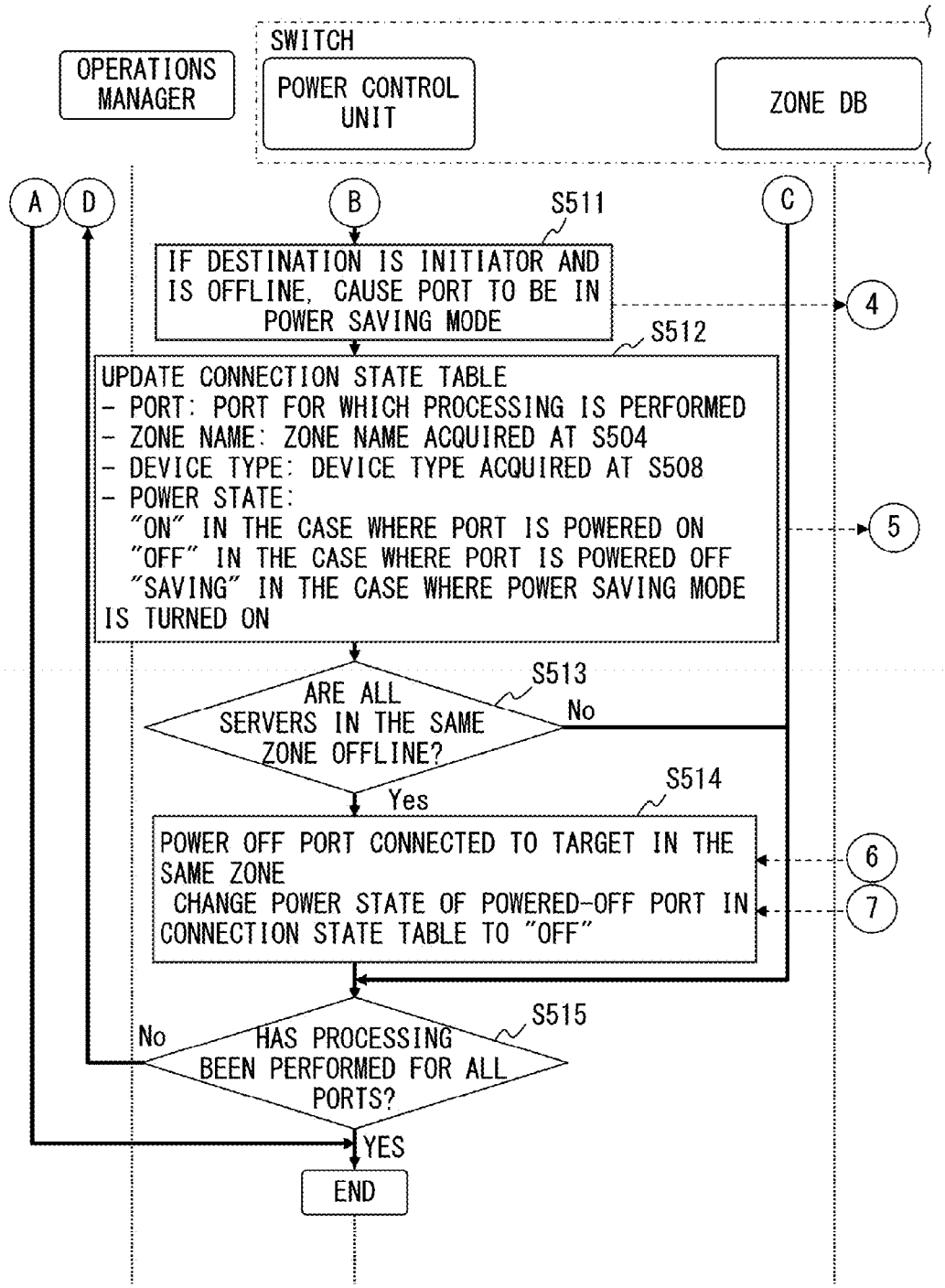
Figure 8D:
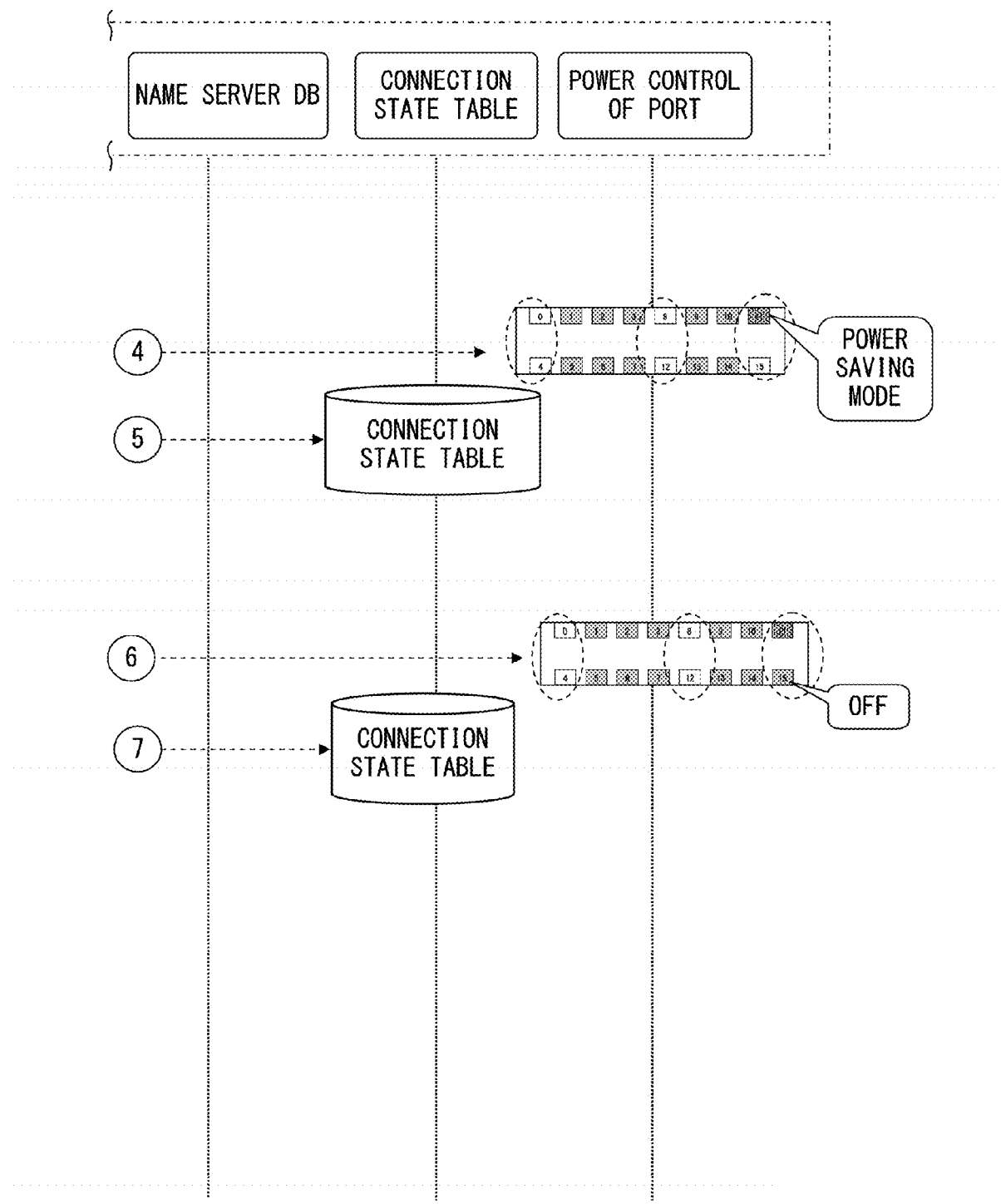

FIG. 7 is a diagram illustrating the system when the power saving mode of the switch is turned on.

In FIG. 7, the servers 201-1 and 202-2 and the storages 401-1 to 401-3 are being powered on, and the server 201-3 is being powered off.

When the power saving mode is turned on, the power saving program 332 starts. That is, by the power saving program 332 being read out into the volatile memory 321 and the CPU 311 executing the power saving program 332 on the volatile memory 321, the power control unit 313 operates.

The power control unit 313 refers to the zone DB 334 and powers off ports for which a zone is not defined. In FIG. 7, the ports 1, 2, 3, 5, 6, 7, 9, 10, 13 and 14 are powered off.

The power control unit 313 refers to the zone DB 334 and the name server DB 333. If a server connected to a port for which a zone is defined is not being powered on, the port connected to the server is changed to be in the "power saving mode". In FIG. 7, the port 11 enters the power saving mode.

If all server-side ports in a zone enter the "power saving mode", the power control unit 313 powers off ports connected to storages which are in the same zone. In FIG. 7, the port 15 is powered off.

The power control unit 313 records the changed state of the port to the connection state table 335.

FIGS. 8A to 8D are a sequence diagram illustrating a process of the system when the power saving mode is turned on.

In step S501, an operations manager turns on the power saving mode of the switch 301. Thereby, the power saving program 332 is read out into the volatile memory 321, the CPU 311 executes the power saving program 332 on the volatile memory 321, and the power control unit 313 starts an operation.

In step S502, the power control unit 313 reads out the zone DB 334. If a zone definition is written in the zone DB 334, the control proceeds to step S503. If a zone definition is not written, the process ends.

In step S503, the power control unit 313 selects one unselected port 341 to be targeted by the following process. For example, the power control unit 313 makes the selection in the ascending order of index numbers of the ports 341.

In step S504, the power control unit 313 reads out the zone DB 334.

In step S505, the power control unit 313 refers to zone names and member names in the zone DB 334 and checks whether the selected port 341 is included in a zone. If the selected port 341 is included in a zone, the control proceeds to step S506. If the selected port 341 is not included in a zone, the control proceeds to step S507.

In step S506, the power control unit 313 powers on the selected port 341.

In step S507, the power control unit 313 powers off the selected port 341.

In step S508, the power control unit 313 reads out the name server DB 333 and acquires information (the device name, connection destination port name, device type, and connection state) about a device connected to the selected port 341.

In step S509, the power control unit 313 checks the device type of the device connected to the selected port 341 on the basis of the acquired device information. If the device type is "Initiator", the control proceeds to step S510. If the device type is not "Initiator", the process ends.

In step S510, the power control unit 313 checks the connection state of the device connected to the selected port 341 on the basis of the acquired device information. If the connection state is "Online", the control proceeds to step S511. If the connection state is "Offline", the process ends.

In step S511, if the device connected to the selected port 341 is a server (that is, the device type is Initiator), and the connection state of the server is Offline, the power control unit 313 causes the selected port 341 to be in the power saving mode. More specifically, the power control unit 313 instructs the switch control unit 312 to stop transmission of an electric signal from the selected port 341, and the switch control unit 312 stops transmission of an electric signal from the selected port 341. Thereby, the selected port 341 performs only reception of an electric signal, and, therefore, power consumption is reduced.

In step S512, the power control unit 313 updates the connection state table 335. More specifically, the power control unit 313 updates the port, the zone name, and the device type in the connection state table 335 to the index number of the selected port 341, the zone name of the zone which includes the selected port 341, the device type of the device connected to the selected port 341, respectively. The power control unit 313 updates the power state in the connection state table 335 to "On" if the selected port 341 is powered on, updates the power state in the connection state table 335 to "Off" if the port 341 is powered off, and updates the power state in the connection state table 335 to "Saving" if the port 341 is caused to be in the power saving mode.

In step S513, the power control unit 313 refers to the connection state table 335 and checks whether the connection states of all servers in the zone which includes the selected port 341 are "Offline". If the connection states of all the servers in the zone which includes the selected port 341 are "Offline", the control proceeds to step S514. If the connection state of any of the servers in the zone which includes the selected port 341 is "Online", the process ends.

In step S514, the power control unit 313 powers off a port 341 to which a storage 401 is connected in the zone which includes the selected port 341. The power control unit 313 changes the power state of the port 341 which has been powered off in the connection state table 335, to "Off".

In step S515, if processing has been performed for all the ports 341 (that is, all the ports have been selected at step S503), the process ends. If there is a port for which processing has not been performed, the control returns to step S503.

Next, a process performed in the case where a server is powered off will be described.

Figure 9:
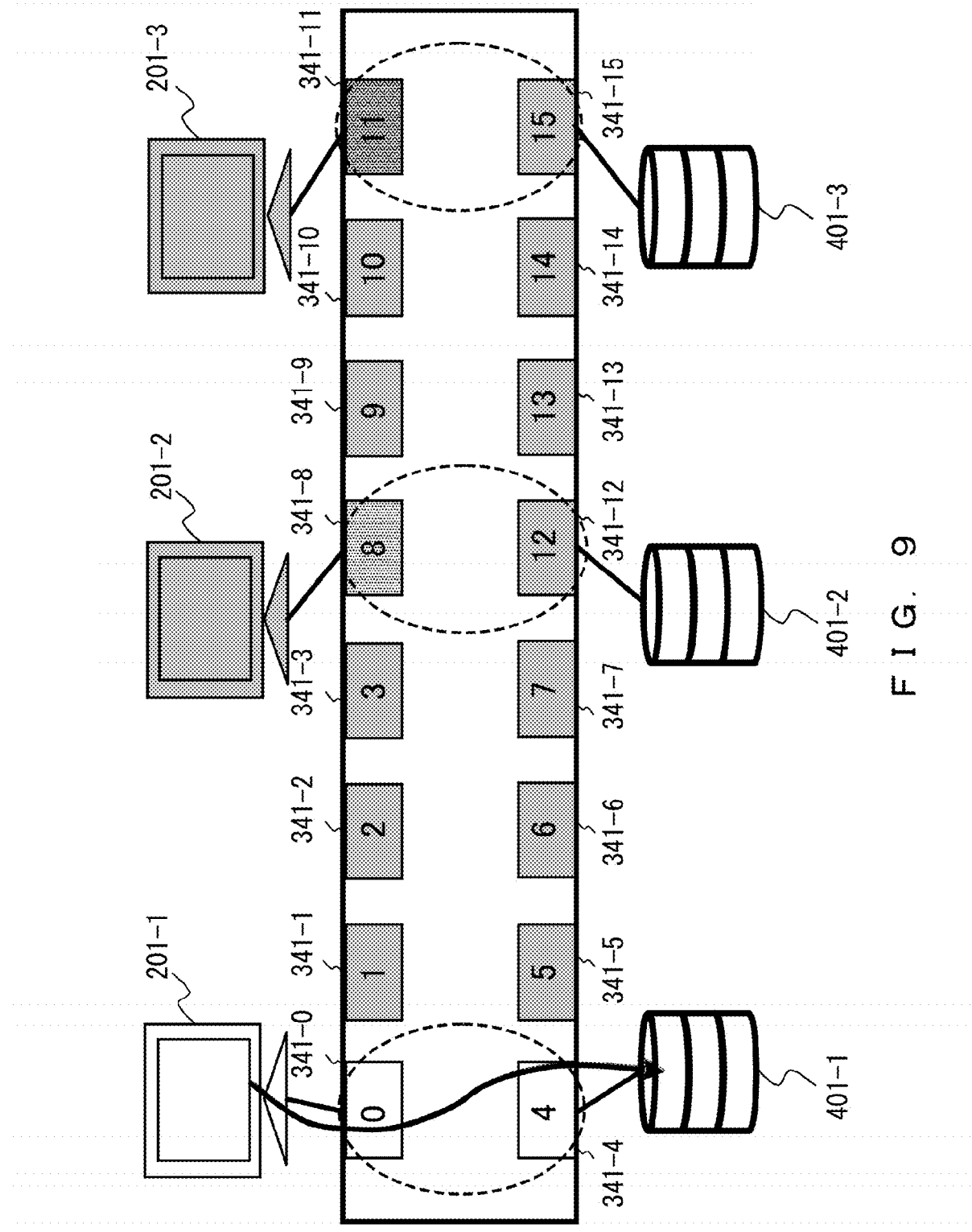
FIG. 9 is a diagram illustrating the system when a server is powered off.
Figure 10A:
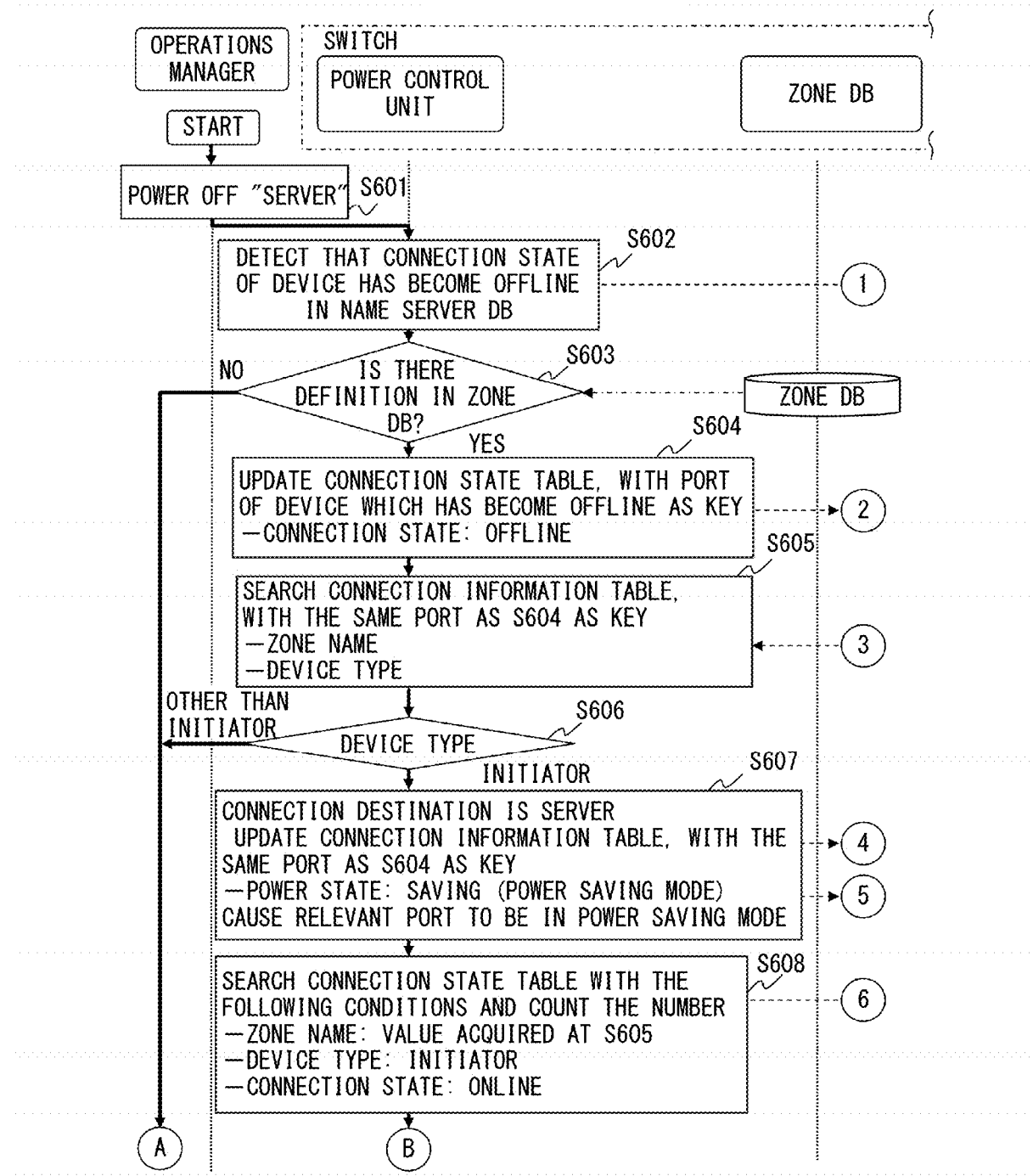
FIG. 10A is a sequence diagram illustrating a process of the system when the server is powered off.
Figure 10D:
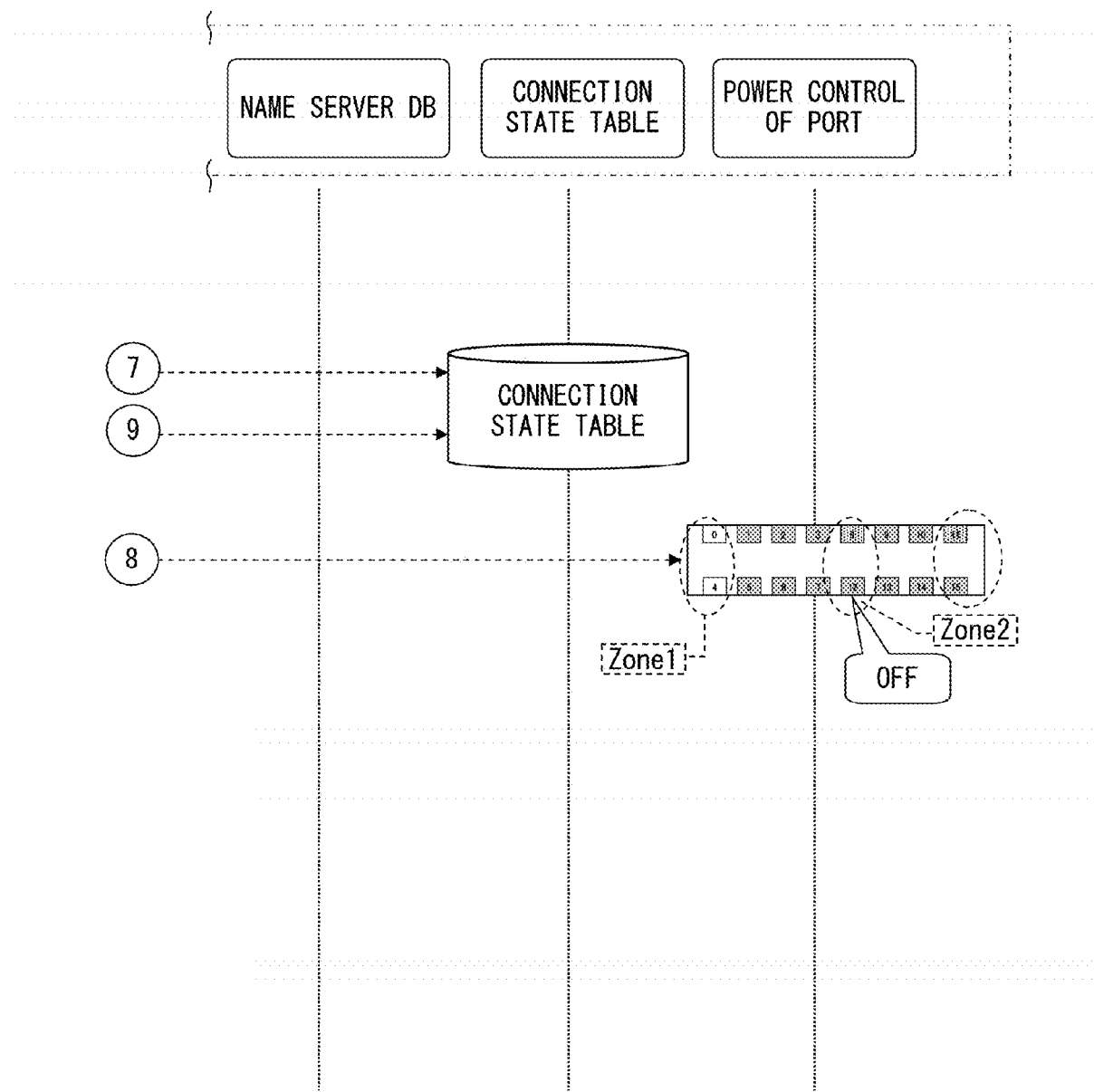
FIG. 10D is the sequence diagram illustrating the process of the system when the server is powered off.

FIG. 9 is a diagram illustrating the system when a server is powered off.

FIG. 9 illustrates the system when the server 201-2 has been powered off in the system state described with reference to FIG. 7.

When the server 201-2 is powered off, the power control unit 313 refers to the zone DB 334 and the name server DB 333 and changes the port 8 connected to the server 201-2 to be in the power saving mode.

If all ports connected to servers in a zone which includes the port 8 are in the power saving mode, the power control unit 313 powers off the port 12 connected to a storage which is in the same zone.

FIGS. 10A to 10D are sequence diagrams illustrating a process of the system when a server is powered off.

In step S601, the operations manager powers off a server 201. When the server 201 is powered off, its connection state in the name server DB 333 is changed to "Offline".

In step S602, the power control unit 313 detects that the connection state in the name server DB 333 has been changed to "Offline". That is, the power control unit 313 detects that the server 201 has been powered off (connection with the server 201 has become offline).

In step S603, the power control unit 313 reads out the zone DB 334. If a zone definition is written in the zone DB 334, the control proceeds to step S604. If a zone definition is not written, the process ends.

In step S604, the power control unit 313 updates the connection state of a port connected to the offline server 201 in the connection state table 335 to "Offline", with the port connected to the offline server 201 as a key.

In step S605, the power control unit 313 searches the connection state table 335, with the port connected to the offline server 201 as a key, to acquire a zone name and a device type corresponding to the port connected to the offline server 201.

In step S606, if the device type acquired at step S605 is Initiator, the control proceeds to step S607. If the device type is not Initiator, the process ends.

In step S607, the power control unit 313 updates the power state of the port connected to the offline server 201 in the connection state table 335 to "Saving". The power control unit 313 causes the port connected to the offline server 201 to be in the power saving mode. More specifically, the power control unit 313 instructs the switch control unit 312 to stop transmission of an electric signal from the port connected to the offline server 201, and the switch control unit 312 stops transmission of an electric signal from the port connected to the offline server 201.

In step S608, the power control unit 313 searches the connection state table 335, with the zone name acquired in step S605, the device type "Initiator" and the connection state "Online" as search conditions. The power control unit 313 counts the number of records detected by the search.

In step S609, if the value of the number counted at step S608 is larger than 0, the process ends. If the value of the number counted at step S608 is 0, the control proceeds to step S610.

In step S610, the power control unit 313 searches the connection state table 335, with the zone name acquired at step S605, the device type "Target" and the connection state "Online" as search conditions. The power control unit 313 powers off the port 341 of a record found by the search. The power control unit 313 updates the connection state and power state of the record found by the search of the connection state table 335 to "Offline" and "Off", respectively.

Next, a process performed in the case where a server is powered on will be described.

Figure 11:
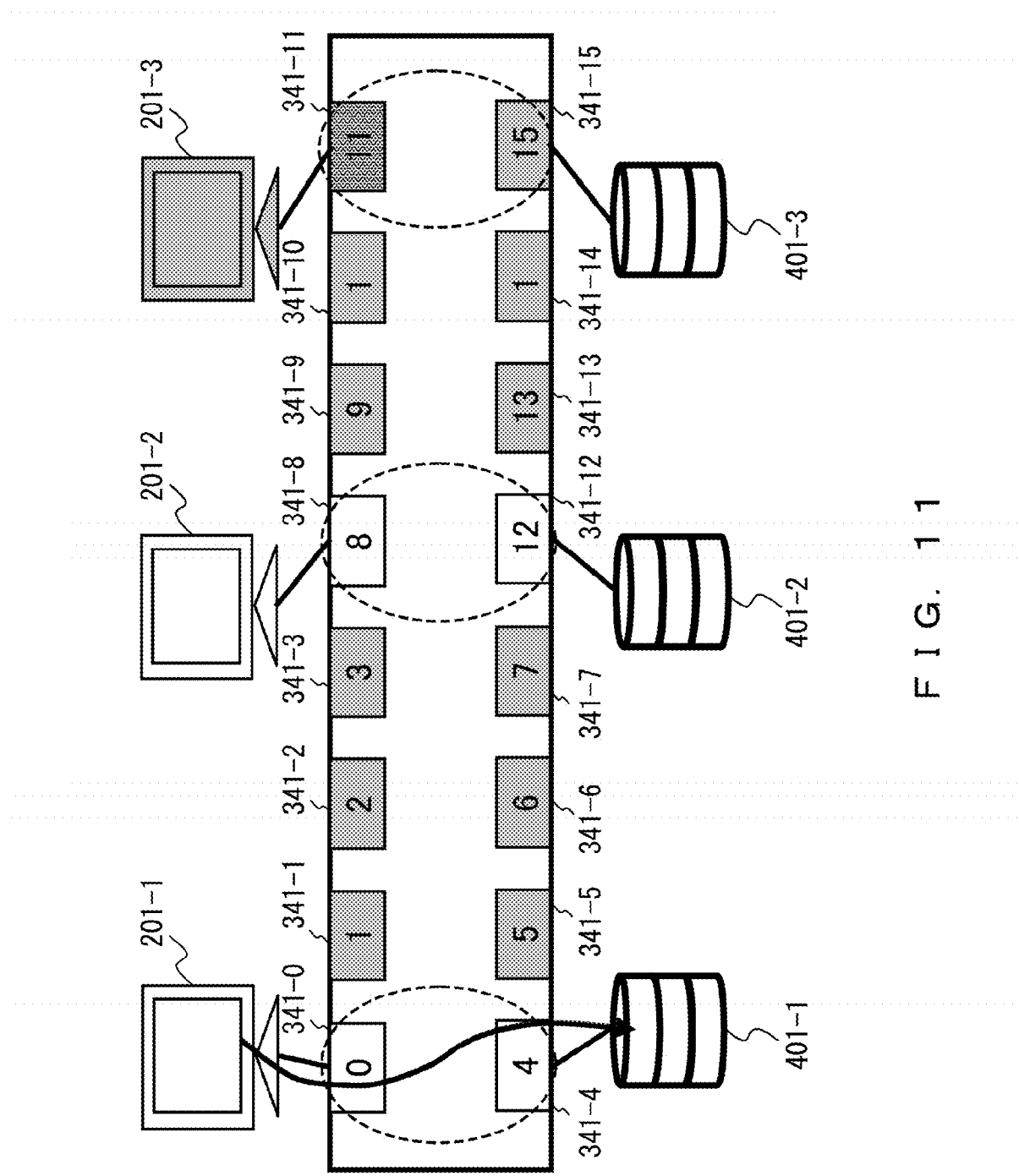
Figure 12A:
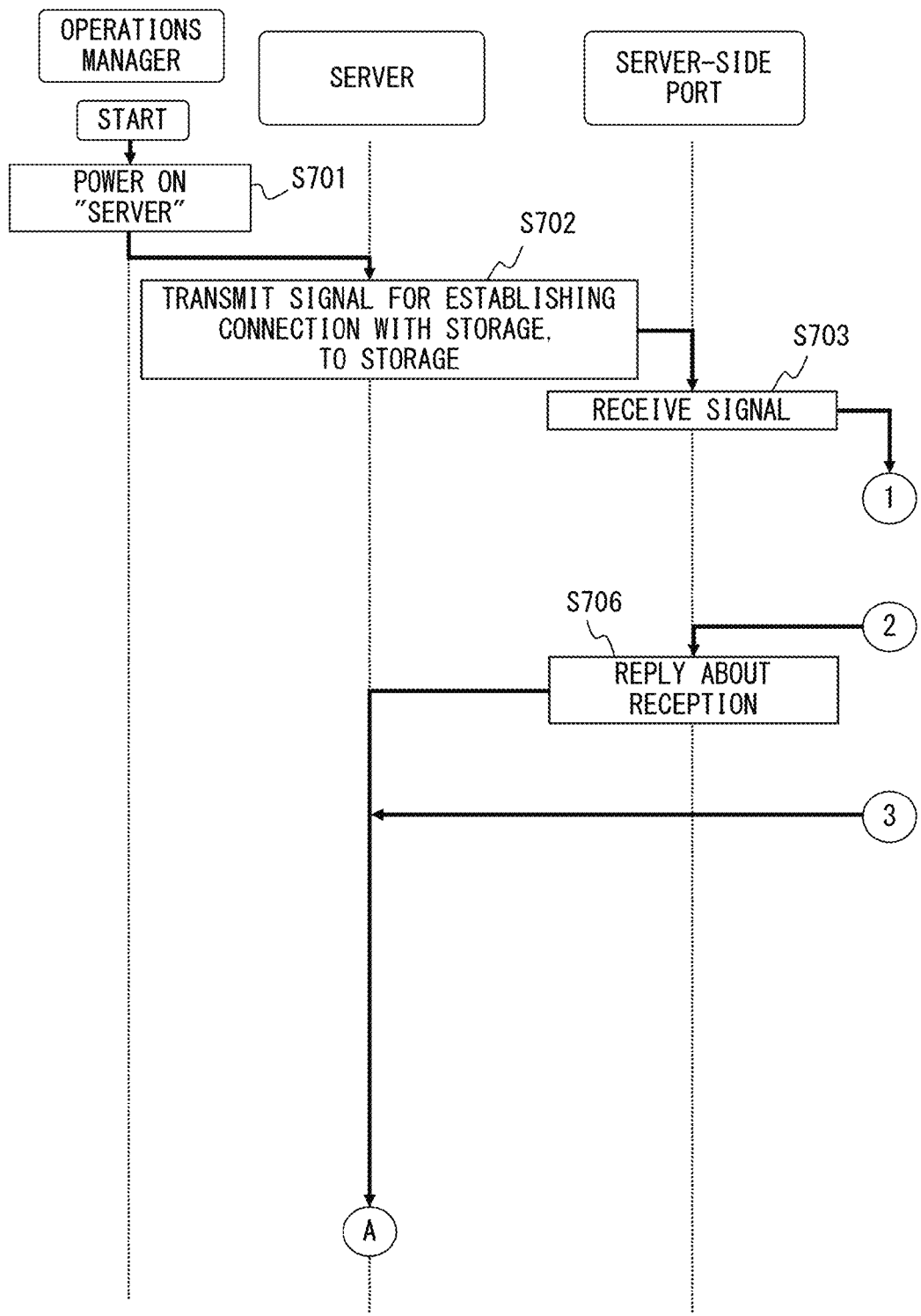
Figure 12B:
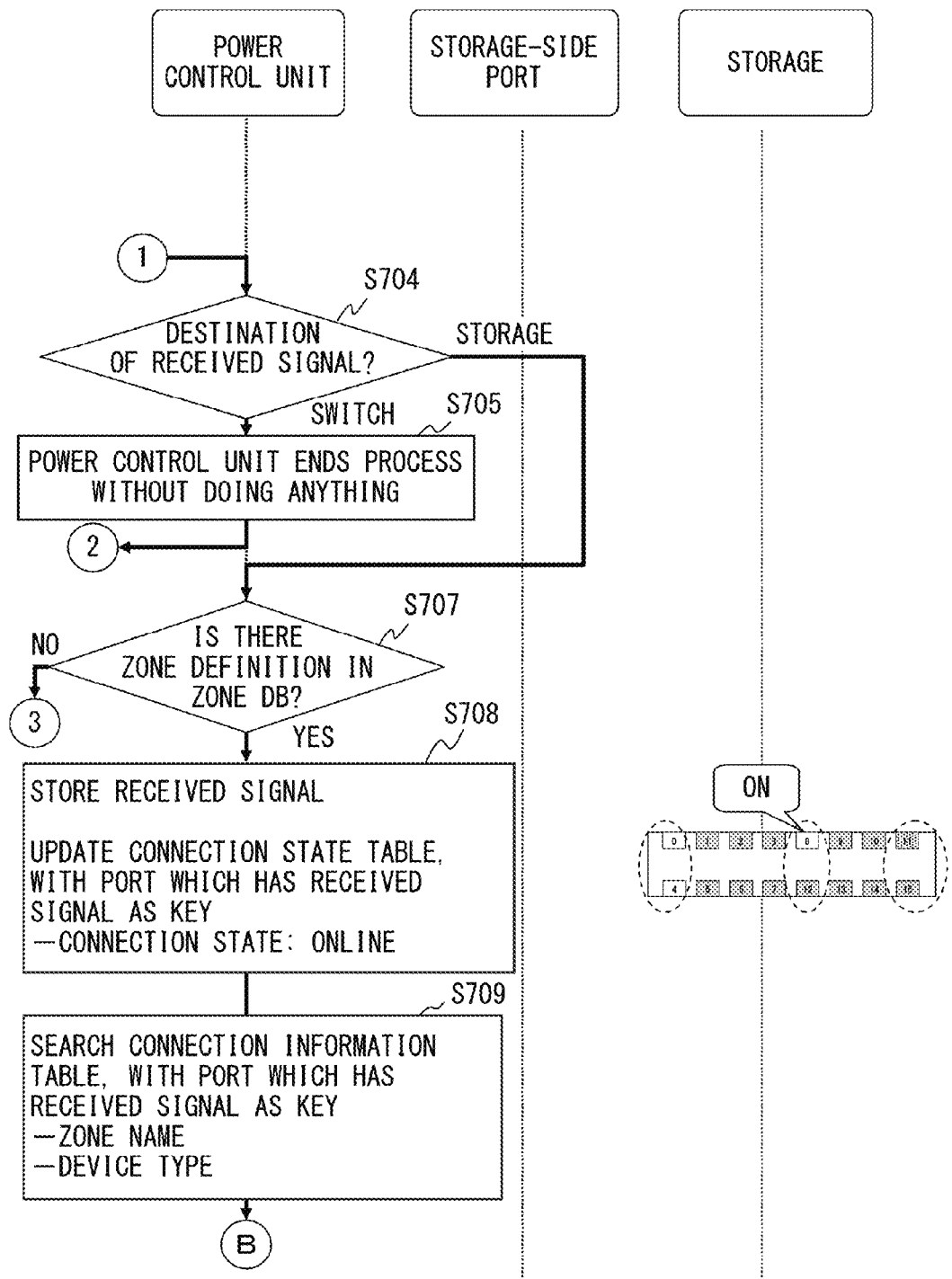
Figure 12C:
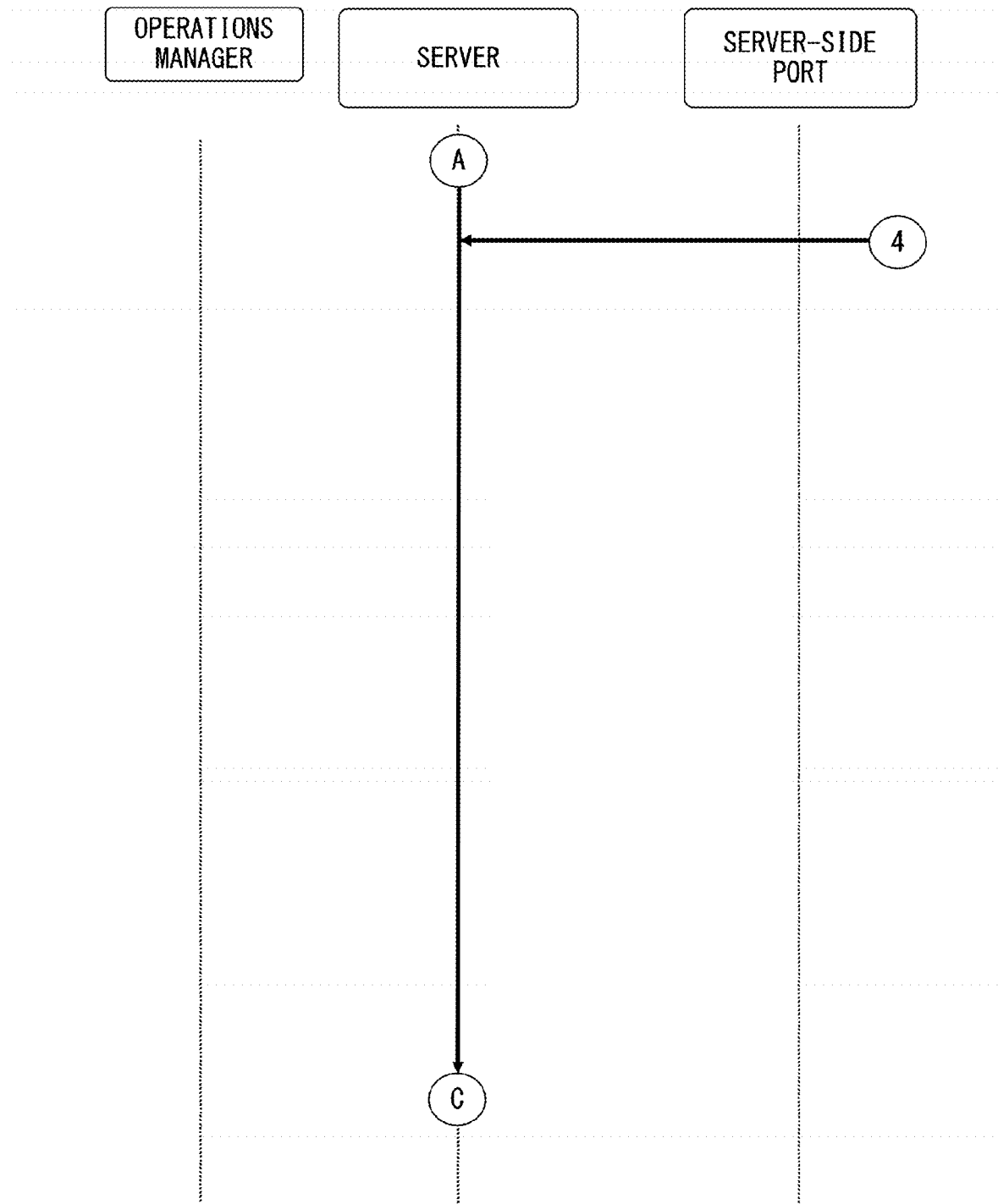
Figure 12D:
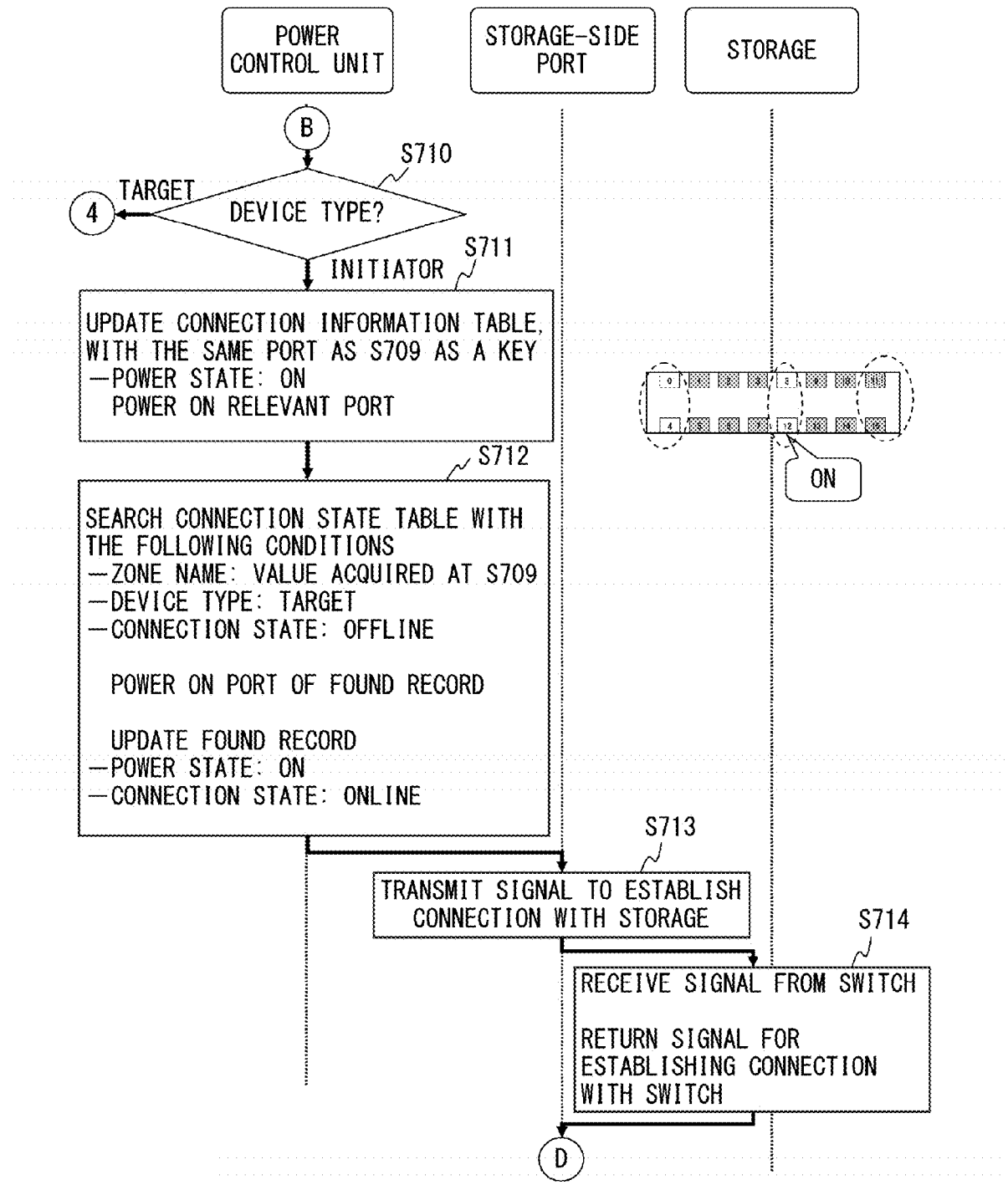
Figure 12E:
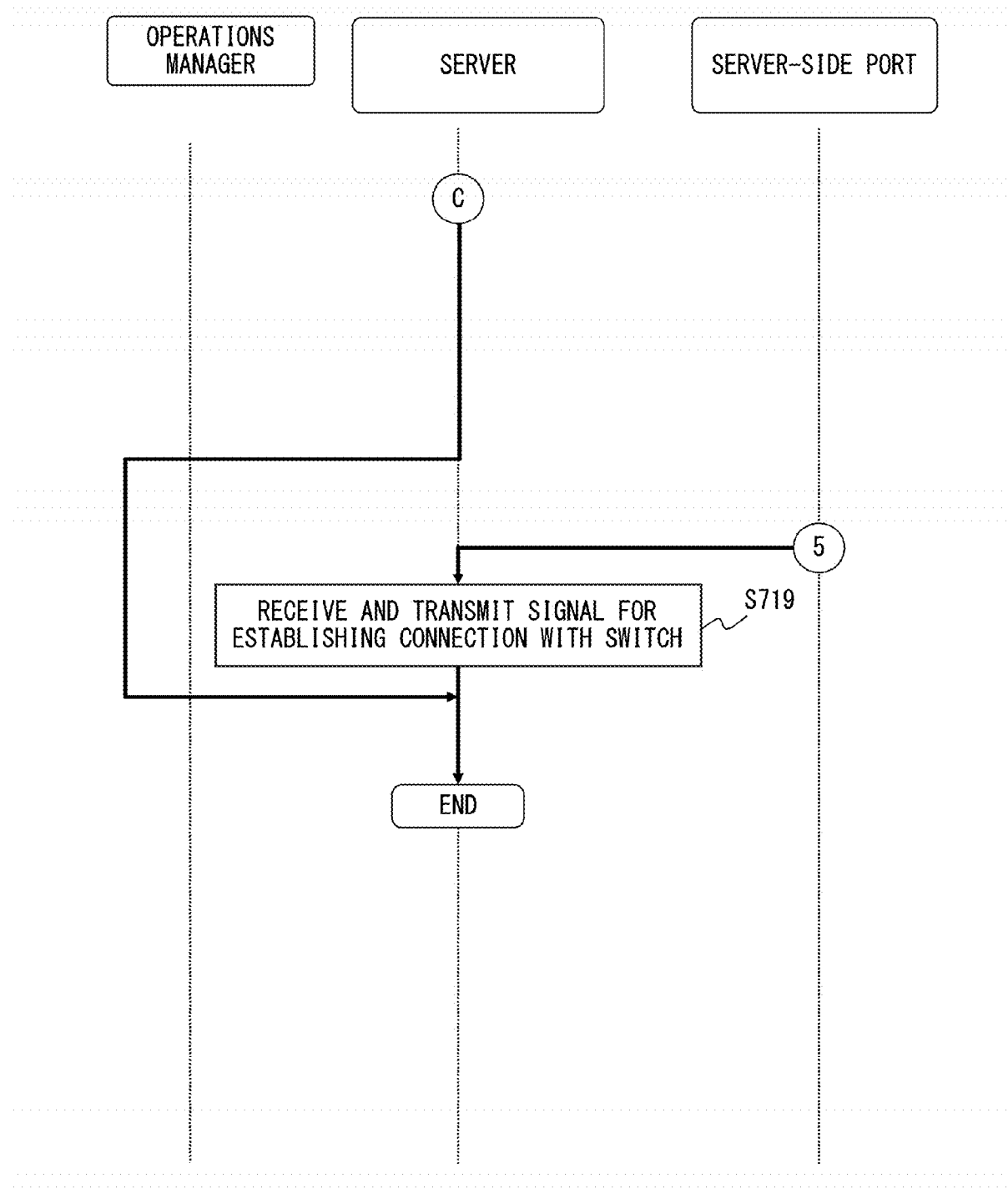

FIG. 11 is a diagram illustrating the system when a server is powered on.

FIG. 11 is a diagram illustrating the system when the server 201-2 is powered on in the system described with reference to FIG. 9.

When the server 201-2 is powered on, a signal from the server 201-2 is received by the port 8 which is in the power saving mode.

The power control unit 313 analyzes the content of the received signal and, if the received signal is a signal destined for a storage, stores the received signal. The power control unit 313 powers on the port 8 which has received the signal (that is, the port 8 connected to the server 201-2). The power control unit 313 refers to the zone DB 334, powers on the port 12 connected to a storage which is in the same zone as the port which has received the signal, establishes communication with the storage 401-2, and then transmits the stored signal from the server 201-2 to the storage 401-2.

FIGS. 12A to 12F are diagrams illustrating a process of the system when a server is powered on.

In the description below, a port connected to a server 201, and a port connected to a storage 401 may be expressed as a server-side port and a storage-side port, respectively.

In step S701, the operations manager powers on a server 201. When the server 201 is powered on, a connection state corresponding to a port connected to the server 201 in the name server DB 333 is changed to "Online".

In step S702, the server 201 transmits a signal for establishing connection between the server 201 and the storage 401, to the storage 401.

In step S703, the switch 301 receives the signal for establishing connection between the server 201 and the storage 401 at the server-side port.

In step S704, the power control unit 313 checks the destination of the received signal. If the destination of the signal is the switch, the control proceeds to step S705. If the destination of the signal is the storage, the control proceeds to step S707.

In step S705, the power control unit 313 does not do anything.

In step S706, the switch control unit 312 powers on the port which has received the signal and replies to the server 201 to the effect that the signal has been received.

In step S707, the power control unit 313 reads out the zone DB 334. If a zone definition is written in the zone DB 334, the control proceeds to step S708. If a zone definition is not written, the process ends.

In step S708, the power control unit 313 stores the signal received from the server 201 into the volatile memory 321 or the nonvolatile memory 331. The power control unit 313 updates the connection state of the port which has received the signal in the connection state table 335 to "Online", with the port which has received the signal (that is, the port to which the powered-on server 201 is connected) as a key.

In step S709, the power control unit 313 searches the connection state table 335, with the port which has received the signal as a key, to acquire a zone name and a device type corresponding to the port which has received the signal.

In step S710, if the device type acquired at step S709 is "Target", the process ends. If the device type acquired at step S709 is "Initiator", the control proceeds to step S711.

In step S711, the power control unit 313 updates the power state of the port which has received the signal in the connection state table 335 to "On", with the port which has received the signal as a key. The power control unit 313 powers on the port which has received the signal.

In step S712, the power control unit 313 searches the connection state table 335, with the zone name acquired at step S709, the device type "Target" and the connection state "Online" as search conditions. The power control unit 313 powers on the port 341 of a record found by the search. The power control unit 313 updates the connection state and power state of the record found by the search of the connection state table 335 to "Online" and "On", respectively.

In step S713, the power control unit 313 transmits the signal to establish connection between the switch 301 and the storage 401, to the storage 401.

In step S714, the storage 401 receives the signal from the switch 301 and returns a signal for establishing connection between the storage 401 and the switch 301, to the switch 301.

In step S715, the switch 301 receives the signal for establishing connection between the storage 401 and the switch 301, from the storage 401. The switch control unit 312 updates the connection state of a port connected to the storage in the name server DB 333 to "Online".

In step S716, by referring to the name server DB 333 and finding that the connection state of the port connected to the storage is "Online", the power control unit 313 confirms that connection with the storage 401 has been established. The power control unit 313 transmits the stored signal for establishing connection between the server 201 and the storage 401, to the storage 401.

In step S717, the storage 401 receives the signal for establishing connection between the server 201 and the storage 401 which has been transmitted from the server 201, from the switch 301, and transmits a signal for establishing connection between the storage 401 and the server 201, which is destined for the server, to the switch 301.

In step S718, the switch 301 receives the signal from the storage 401 and relays the signal to the server 201.

In step S719, the server 201 receives and transmits the signal for establishing connection with the switch 301.

According to the switch of the embodiment, it is possible to reduce power consumption. Furthermore, according to the switch of the embodiment, it is possible to execute power control of a port depending on the state of a device connected to the port.

All examples and conditional language provided herein are intended for pedagogical purposes to aiding the reader in understanding the invention and the concepts contributed by the inventor to further the art, and are not to be construed as being limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A switch connected to external devices, the switch comprising:
   a plurality of ports connected to the external devices;
   a storage unit to store a zone database indicating a group in which each of the plurality of ports is included; and
   a processor to perform power control of the plurality of ports and permit communication only between ports included in the same group, on the basis of the zone database,
   the processor powers off a port that is not included in any groups among the plurality of ports, on the basis of the zone database,
   the external devices are an information processing device or a storage device storing data;
   the storage unit further stores a name server database in which a type of the external device connected to each of the plurality of ports and a state of connection with the external device are written; and the processor continuously transmits a signal from a port when the port is being powered on, refers to the name server database, determines whether the state of connection with the external device is offline and the type of the external device is the information processing device based on the name server database, and, when the state of connection with the external device is offline and the type of the external device is the information processing device, stops transmission of the signal from the port connected to the information processing device.

2. The switch according to claim 1, wherein the storage unit further stores a connection state table in which the group in which each of the plurality of ports is included, the type of the external device connected to each of the plurality of ports, and the state of connection with the external device are written; and when states of connection with all information processing devices connected to ports included in the same group that includes the port to which the information processing device whose state of connection is offline is connected are offline, on the basis of the connection state table, the processor powers off a port connected to the storage device, among the ports included in the same group.

3. A switch connected to external devices, the switch comprising:

a plurality of ports connected to the external devices;

a storage unit to store a zone database indicating a group in which each of the plurality of ports is included, and a connection state information in which the group in which each of the plurality of ports is included, a type of the external device connected to each of the plurality of ports, and a state of connection with the external device are written; and a processor to perform power control of the plurality of ports, permit communication only between ports included in the same group, on the basis of the zone database, and continuously transmit a signal from a port when the port is being powered on, wherein the processor detects that the external device has been powered off, refers to the connection state information, determines whether the type of the external device that has been powered off is an information processing device based on the connection state information, and, when the type of the external device that has been powered off is the information processing device, stops transmission of the signal from a port connected to the information processing device that has been powered off.

4. The switch according to claim 3, wherein the processor refers to the connection state information, and, when there is not a port connected to an information processing device that is being powered on, among ports in a group that includes the port connected to the information processing device that has been powered off, powers off ports connected to storage devices, among the ports in the group that includes the port connected to the information processing device that has been powered off.

5. A control method executed by a switch comprising a plurality of ports connected to external devices and a storage unit storing a zone database indicating a group in which each of the plurality of ports is included, and permitting communication only between ports included in the same group, the method comprising:

referring to the zone database; and powering off a port that is not included in any groups among the plurality of ports, the external devices are an information processing device or a storage device storing data;

the storage unit further stores a name server database in which a type of the external device connected to each of the plurality of ports and a state of connection with the external device are written; and the switch continuously transmits a signal from a port when the port is being powered on; and the control method further comprises:

referring to the name server database;

determining whether the state of connection with the external device is offline and the type of the external device is the information processing device based on the name server database; and when the state of connection with the external device is offline and the type of the external device is the information processing device, stopping transmission of the signal from the port connected to the information processing device.

6. The control method according to claim 5, wherein the storage unit further stores a connection state information in which the group in which each of the plurality of ports is included, the type of the external device connected to each of the plurality of ports, and the state of connection with the external device are written; and the control method further comprises:

referring to the connection state information; and when states of connection with all information processing devices connected to ports included in the same group that includes the port to which the information processing device whose state of connection is offline is connected are offline, powering off a port connected to the storage device, among the ports included in the same group.

7. A control method executed by a switch comprising a plurality of ports connected to external devices and a storage unit storing a zone database indicating a group in which each of the plurality of ports is included, and a connection state information in which the group in which each of the plurality of ports is included, a type of the external device connected to each of the plurality of ports, and a state of connection with the external device are written, permitting communication only between ports included in the same group, on the basis of the zone database, and continuously transmitting a signal from a port when the port is being powered on, the method comprising:

detecting the external device has been powered off;

referring to the connection state information;

determining whether the type of the external device that has been powered off is an information processing device based on the connection state information; and when the type of the external device that has been powered off is the information processing device, stopping transmission of the signal from the port connected to the information processing device that has been powered off.

8. The control method according to claim 7, further comprising:

referring to the connection state information; and when there is not a port connected to an information processing device that is being powered on, among ports in a group that includes the port connected to the information processing device that has been powered off, powering off ports connected to storage devices, among the ports in the group that includes the port connected to the information processing device that has been powered off.

\* \* \* \* \*